United States Patent
Yamane et al.

(10) Patent No.: US 11,161,418 B2
(45) Date of Patent: Nov. 2, 2021

(54) CONTROL DEVICE OF ELECTRIC VEHICLE

(71) Applicant: TOYOTA JIDOSHA KABUSHIKI KAISHA, Toyota (JP)

(72) Inventors: Naruto Yamane, Susono (JP); Kazuya Okumura, Mishima (JP); Hideki Kubonoya, Toyota (JP); Fumiki Tanahashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 16/692,303

(22) Filed: Nov. 22, 2019

(65) Prior Publication Data

US 2020/0247244 A1 Aug. 6, 2020

(30) Foreign Application Priority Data

Feb. 4, 2019 (JP) .............................. JP2019-018008

(51) Int. Cl.
*B60L 15/20* (2006.01)

(52) U.S. Cl.
CPC ........... *B60L 15/20* (2013.01); *B60L 2240/12* (2013.01); *B60L 2240/423* (2013.01); *B60L 2240/461* (2013.01); *B60L 2240/465* (2013.01); *Y02T 10/64* (2013.01)

(58) Field of Classification Search
CPC ................. B60L 15/20; B60L 2240/12; B60L 2240/465; B60L 2240/461; B60L 2240/423; B60L 3/102; Y02T 10/64

See application file for complete search history.

(56) References Cited

U.S. PATENT DOCUMENTS

| | | | | |
|---|---|---|---|---|
| 8,761,985 | B2 * | 6/2014 | Tang | .................. B60L 15/2036 701/22 |
| 2015/0284005 | A1 * | 10/2015 | Suzuki | ...................... B60T 8/17 701/22 |
| 2016/0193919 | A1 * | 7/2016 | Zhang | ..................... B60L 3/102 180/197 |
| 2017/0247035 | A1 * | 8/2017 | Ienaga | ................. B60W 10/119 |
| 2018/0319384 | A1 | 11/2018 | Yasui et al. | |

FOREIGN PATENT DOCUMENTS

| JP | 2017-100506 A | | 6/2017 |
|---|---|---|---|
| JP | 2017-158337 | * | 9/2017 |
| JP | 6314373 B2 | | 4/2018 |

\* cited by examiner

*Primary Examiner* — Michael J Zanelli
(74) *Attorney, Agent, or Firm* — Oliff PLC

(57) ABSTRACT

A control device of an electric vehicle includes: a target rotation speed calculation unit that calculates a target rotation speed of a drive wheel based on a vehicle body speed; and a slip control unit that detects a slip of the drive wheel when a wheel speed exceeds the target rotation speed of the drive wheel and that controls motor torque of the motor in such a manner that the wheel speed becomes an appropriate rotation speed in detection of the slip. Further, the slip control unit controls the motor torque by feedback control according to a difference between the rotation speed of the motor and the target rotation speed of the drive wheel in detection of the slip.

6 Claims, 5 Drawing Sheets

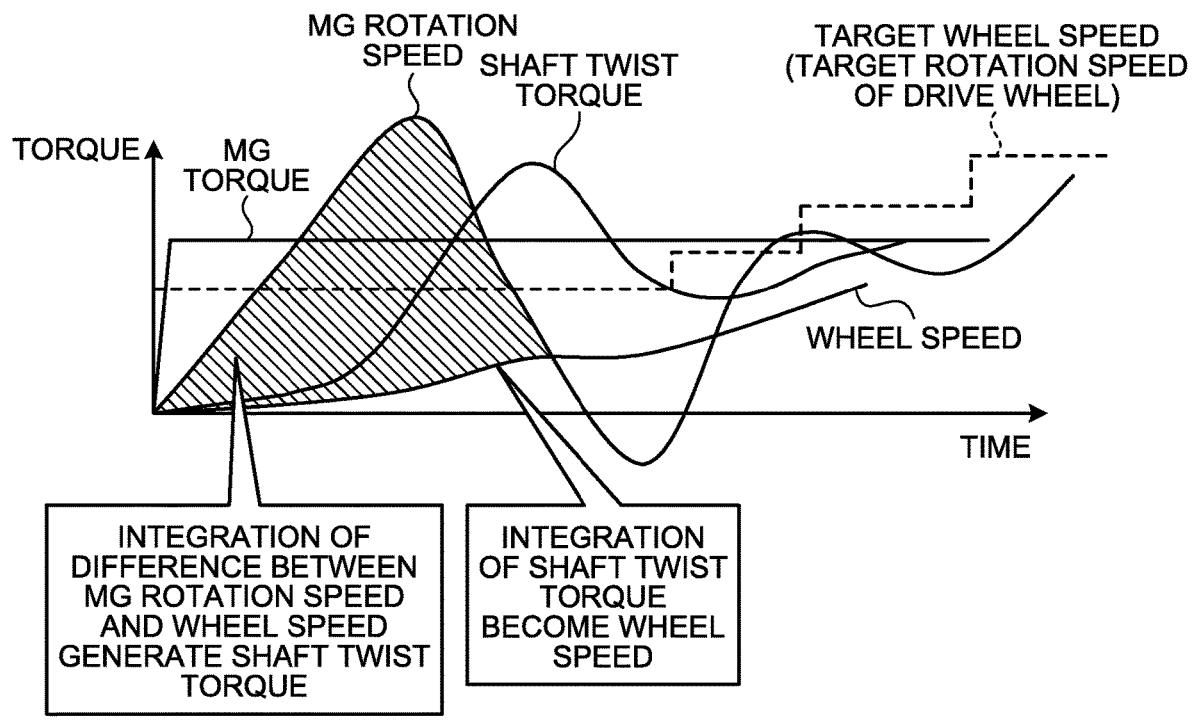
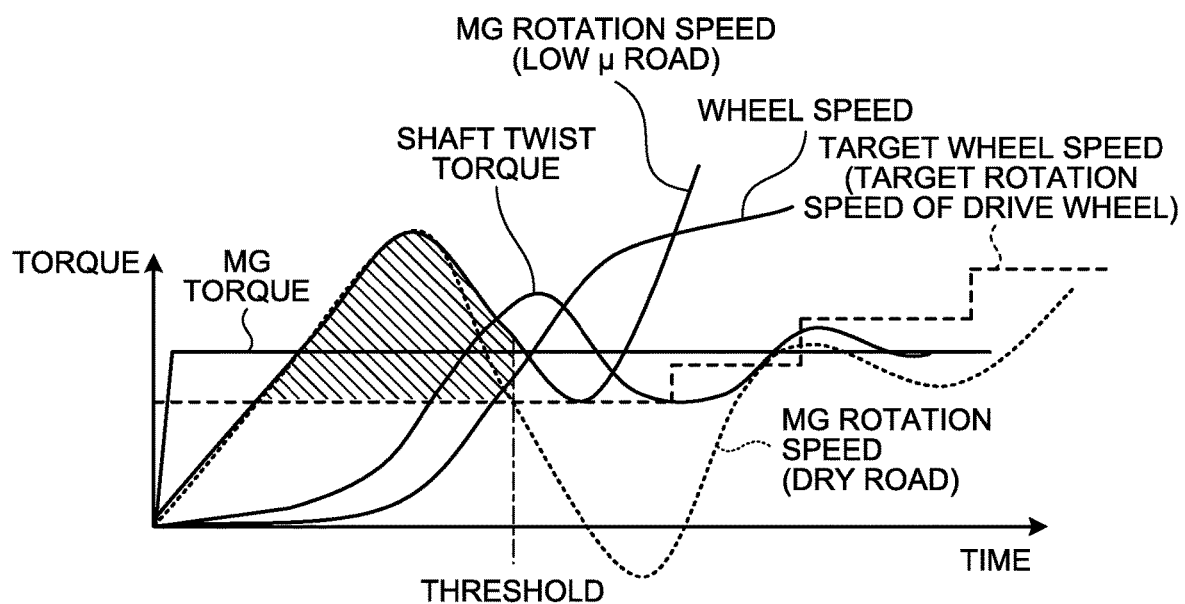

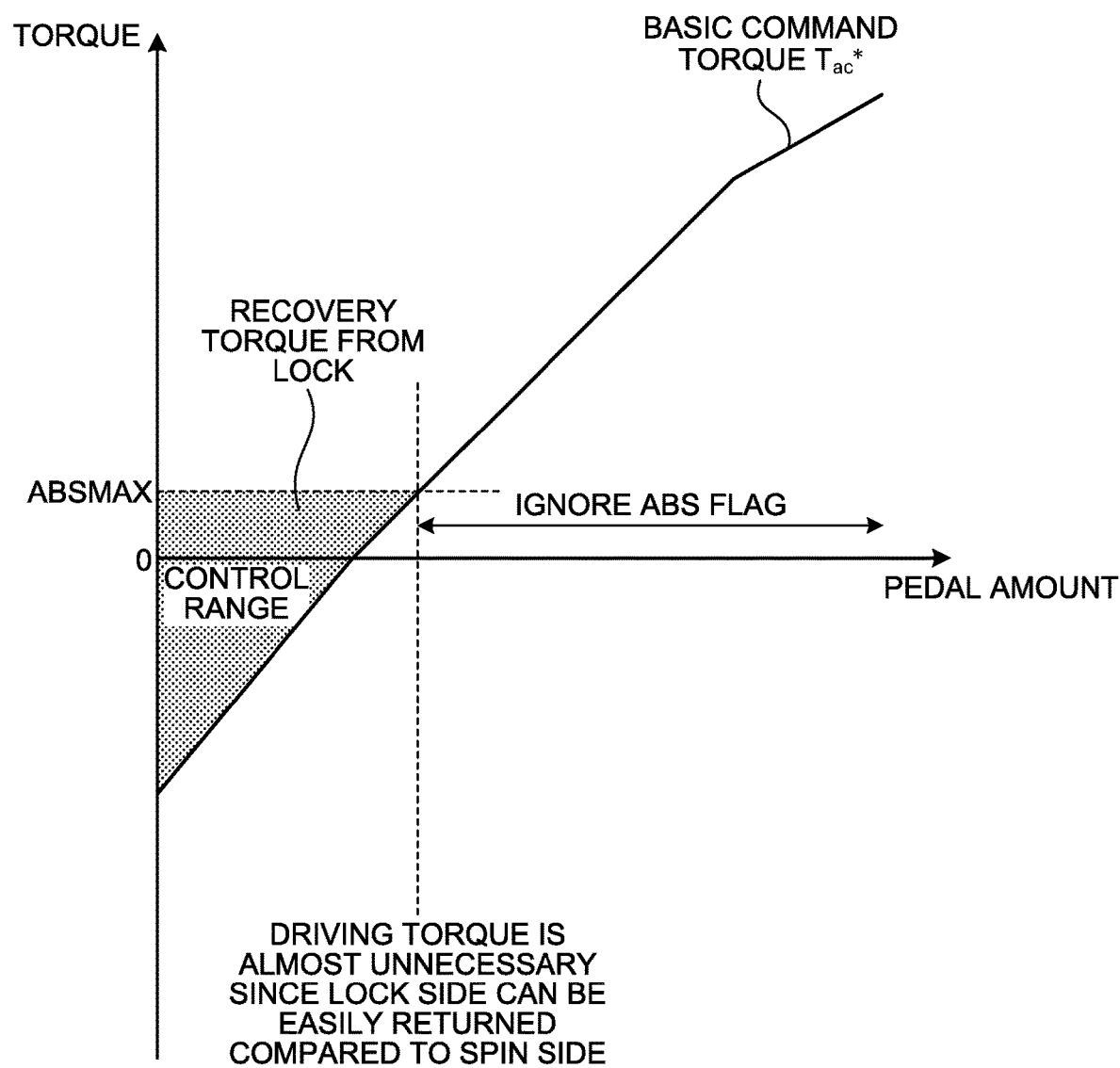

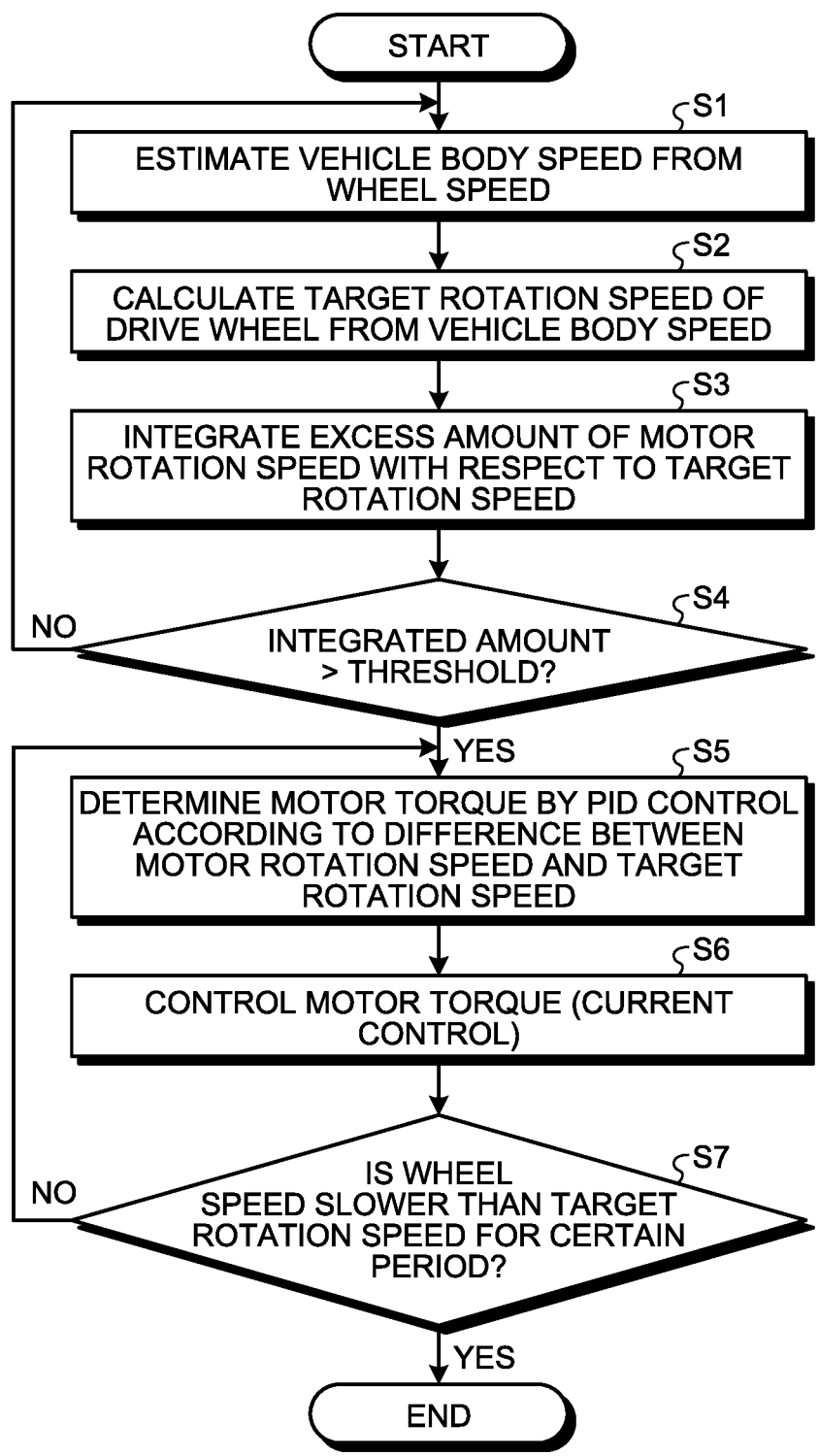

CONTROL DEVICE OF ELECTRIC VEHICLE

CROSS-REFERENCE TO RELATED APPLICATION(S)

The present application claims priority to and incorporates by reference the entire contents of Japanese Patent Application No. 2019-018008 filed in Japan on Feb. 4, 2019.

BACKGROUND

The present disclosure relates to a control device of an electric vehicle.

In Japanese Laid-open Patent Publication No. 2017-100506, disclosed is a method of detecting a slip based on an output of a wheel speed sensor (wheel speed) and a vehicle body speed, and controlling motor torque of a driving motor in such a manner that the wheel speed becomes an appropriate rotation speed in detection of the slip.

SUMMARY

There is a need for providing a control device of an electric vehicle so as to control a slip appropriately.

According to an embodiment, a control device of an electric vehicle including a driving motor, and a rotation speed detecting unit that detects a rotation speed of the motor, includes: a target rotation speed calculation unit that calculates a target rotation speed of a drive wheel on the basis of a vehicle body speed of the electric vehicle; and a slip control unit that detects a slip of the drive wheel in a case where a wheel speed exceeds the target rotation speed of the drive wheel and that controls motor torque of the motor in such a manner that the wheel speed becomes an appropriate rotation speed in detection of the slip. Further, the slip control unit controls the motor torque by feedback control according to a difference between the rotation speed of the motor and the target rotation speed of the drive wheel in detection of the slip.

BRIEF DESCRIPTION OF THE DRAWINGS

FIG. 2 is a view illustrating a relationship between a rotation speed of a motor and a wheel speed on a dry road in the control device of an electric vehicle according to the embodiment of the present disclosure;

FIG. 3 is a view illustrating an outline of determination of a slip by the motor in the control device of an electric vehicle according to the embodiment of the present disclosure;

FIG. 6 is a view illustrating a control range of feedback control in deceleration of the electric vehicle in the control device of an electric vehicle according to the embodiment of the present disclosure; and FIG. 7 is a flowchart illustrating a control method by the control device of an electric vehicle according to the embodiment of the present disclosure.

DETAILED DESCRIPTION

In the related art, a wheel speed sensor generally has low angular resolution, and generates a detection delay. Thus, in a case where slip is detected by utilization of an output of a wheel speed sensor and slip control is performed in a manner of Japanese Laid-open Patent Publication No. 2017-100506, there is a possibility that it is not possible to perform high-speed control and to control slip appropriately.

A control device of an electric vehicle according to an embodiment of the present disclosure will be described with reference to the accompanied drawings. Note that the present disclosure is not limited to the following embodiment. Also, configuration elements in the following embodiment include what is easily replaceable by those skilled in the art or what is substantially identical.

Figure 1:
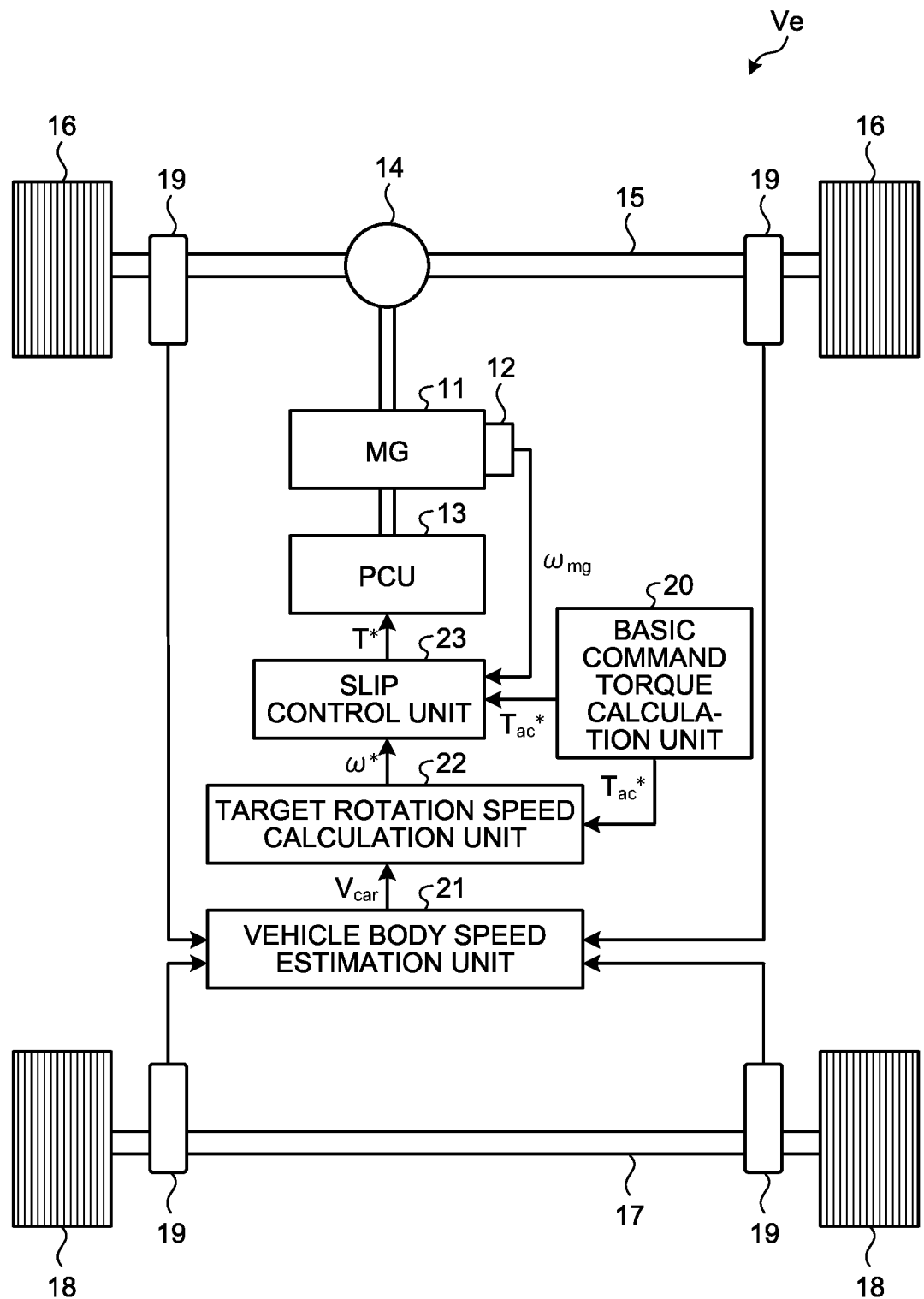
FIG. 1 is a view schematically illustrating a configuration of an electric vehicle to which a control device of an electric vehicle according to an embodiment of the present disclosure is applied.

A configuration of the control device of an electric vehicle according to the embodiment of the present disclosure will be described with reference to FIG. 1. An electric vehicle Ve to which the control device of an electric vehicle according to the present embodiment is applied includes a motor (MG) 11 as a main power source, a power control unit (PCU) 13, a differential gear 14, a drive shaft 15, a drive wheel 16, an axle 17, a driven wheel 18, a wheel speed sensor 19, a basic command torque calculation unit 20, a vehicle body speed estimation unit 21, a target rotation speed calculation unit 22, and a slip control unit 23.

The motor 11 is, for example, a synchronous motor or an induction motor and functions as an electric motor and a generator. Motor torque (MG torque) output from the motor 11 is transmitted the drive wheel 16 through the drive shaft 15. Also, the motor 11 includes a rotation speed detecting unit 12.

The rotation speed detecting unit 12 is to detect a rotation speed of the motor 11 (hereinafter, referred to as "MG rotation speed") and includes a phase sensor such as a resolver, or a rotation speed sensor, for example. The rotation speed detecting unit 12 outputs the detected MG rotation speed ($\omega_{mg}$) to the slip control unit 23.

The power control unit 13 includes an inverter that drives the motor 11, a boost converter that controls voltage, and the like. The wheel speed sensor 19 is provided in each of right and left drive wheels 16 and right and left driven wheels 18, and detects a wheel speed of a target wheel. Then, the wheel speed sensor 19 outputs detected wheel speed to the vehicle body speed estimation unit 21.

More specifically, the basic command torque calculation unit 20 includes a main electronic control unit (ECU). Also, more specifically, the vehicle body speed estimation unit 21 and the target rotation speed calculation unit 22 include a brake ECU provided on a side of a wheel (drive wheel 16 and driven wheel 18). Also, more specifically, the slip control unit 23 includes a motor ECU provided on a side of the motor 11.

The main ECU, the brake ECU, and the motor ECU physically include an electronic circuit that mainly includes a well-known microcomputer including a central processing unit (CPU), a random access memory (RAM), a read only memory (ROM), and an interface for an input/output or the like. A function of each of these ECUs is realized when an application program held in the ROM is loaded into the RAM and executed by the CPU.

The basic command torque calculation unit 20 calculates a basic command torque of the motor 11 by a well-known method on the basis of an accelerator position input from an accelerator position sensor (not illustrated) (operation amount of accelerator pedal operated by driver). Then, the basic command torque calculation unit 20 outputs the calculated basic command torque ($T_{ac}$*) to the target rotation speed calculation unit 22 and the slip control unit 23.

The vehicle body speed estimation unit 21 estimates a vehicle body speed on the basis of a wheel speed input from the wheel speed sensor 19. The vehicle body speed estimation unit 21 estimates an average of a wheel speed of the driven wheels 18 as a vehicle body speed, for example, in a case where the electric vehicle Ve is an FF vehicle and the electric vehicle Ve is driven. Then, the vehicle body speed estimation unit 21 outputs the estimated vehicle body speed ($V_{car}$) to the target rotation speed calculation unit 22.

The target rotation speed calculation unit 22 calculates a target rotation speed of the drive wheel 16 (hereinafter, simplified as "target rotation speed") on the basis of the basic command torque calculated by the basic command torque calculation unit 20 and the vehicle body speed of the electric vehicle Ve which speed is estimated by the vehicle body speed estimation unit 21. More specifically, the target rotation speed calculation unit 22 calculates a target rotation speed corresponding to a traveling state by adding a certain ratio (slip ratio) to the vehicle body speed. Then, the target rotation speed calculation unit 22 outputs the calculated target rotation speed ($\omega$*) to the slip control unit 23.

The slip control unit 23 determines existence/non-existence of a slip of the drive wheel 16 by comparing the wheel speed detected by the wheel speed sensor 19 and the target rotation speed calculated by the target rotation speed calculation unit 22. That is, the slip control unit 23 detects a slip in a case where the wheel speed exceeds the target rotation speed. Then, the slip control unit 23 outputs command torque (T*) to the power control unit 13 in detection of a slip, and controls motor torque of the motor 11 in such a manner that the wheel speed becomes an appropriate rotation speed (in such manner that wheel speed match target rotation speed). Note that in the present embodiment, a series of control from detection of a slip by the slip control unit 23 to control of motor torque is defined as "slip control."

More specifically, the slip control unit 23 controls motor torque of the motor 11 by performing feedback control of the MG rotation speed (speed FB control) according to a difference between the MG rotation speed and the target rotation speed in the slip control.

Here, slip control using a wheel speed which control has been proposed in the related art has the following problems.

(1) A phase delay is generated due to a detention delay, communication delay, or transmission delay of a wheel speed, and high-speed control cannot be performed.

(2) A slight vibration is generated in control of a wheel and as a result, a variation is eventually generated with respect to a target slip ratio.

(3) Since information of a wheel speed is controlled by a brake ECU on a wheel side when the slip control is started, a control delay is generated.

On the one hand, when detection of a slip is performed by utilization of an MG rotation speed and feedback control of the MG rotation speed is performed with a target rotation speed as an aim in a manner of the present embodiment, it is possible to control a detection delay, a communication delay, a transmission delay, and a control delay and to reduce a vibration in control of a wheel.

(Determination of Start of Slip Control)

In the following, a detail of determination of a start of the slip control performed by the control device of an electric vehicle according to the present embodiment will be described with reference to FIG. 2 and FIG. 3. First, the slip control unit 23 integrates an amount for which an MG rotation speed exceeds a target rotation speed. Subsequently, in a case where the above integrated amount exceeds a predetermined threshold, the slip control unit 23 estimates that this is a "state in which a wheel speed exceeds the target rotation speed" and detects a slip.

Here, FIG. 2 is a view illustrating a relationship between the MG rotation speed and the wheel speed on a dry road. As illustrated in the drawing, shaft twist torque, that is, torque transmitted by the twisted drive shaft 15 is generated by integration of a difference between the MG rotation speed and the wheel speed. Also, the integration of this shaft twist torque becomes the wheel speed.

In accordance with these, the control device of an electric vehicle according to the present embodiment estimates that "the wheel speed>the target rotation speed" and determines that there is a slip in a case where an integrated amount of an excess amount of the MG rotation speed with respect to the target rotation speed exceeds a predetermined threshold as illustrated in FIG. 3. That is, in the present embodiment, it is determined that there is a slip in a case where the target rotation speed is still exceeded even when a twist for necessary torque is generated in the drive shaft 15 by a rotation of the motor 11. Accordingly, since it is possible to remove a gap between the MG rotation speed and the wheel speed and to detect a slip at high speed, it is possible to start slip control without a time lag.

Here, a threshold (angle) in the slip determination illustrated in FIG. 3 is determined in proportion to magnitude of a fluctuation amount of motor torque. This fluctuation amount of the motor torque is calculated from a difference between current motor torque and motor torque through a predetermined filter (such as lowpass filter) in order to see a time change in the motor torque. Then, the slip determination is performed by utilization of the threshold proportional to the difference.

The motor torque becomes a rotation speed different from the wheel speed for an amount of a twist of the drive shaft 15 or an engagement backlash of a gear. However, by determining a threshold in the slip determination in proportion to magnitude of a fluctuation amount of the motor torque, it is possible to add an amount of the twist of the drive shaft 15 or the engagement backlash of the gear. Thus, it is possible to determine a start of the slip control accurately without a delay.

Note that in a case where the motor torque does not fluctuate across 0 (such as case of fluctuation from positive torque to positive torque or fluctuation from negative torque to negative torque), it is only necessary to consider a twist of the drive shaft 15. However, in a case where the motor torque fluctuates across 0 (fluctuation from negative torque to positive torque or fluctuation from positive torque to negative torque), a deviation for an amount of an engagement backlash of a gear is generated in addition to a twist of the drive shaft 15. Thus, in a case where the motor torque fluctuates across 0, it is preferable to add a predetermined angle corresponding to an amount of the engagement backlash of the gear with respect to the threshold. Accordingly, it is possible to determine the threshold in consideration of an angle for an amount that is not proportional to the motor torque due to the engagement backlash of the gear.

As described above, the slip control unit 23 determines that "the wheel speed>the target rotation speed" in a case where an excess amount of the MG rotation speed with respect to the target rotation speed exceeds a predetermined threshold. However, for example, in a case where it is detected that the wheel speed detected by the wheel speed sensor 19 exceeds the target rotation speed prior to that, a slip may be detected in favor of a result of the determination.

(Feedback Control)

In the following, a detail of the feedback control in the slip control performed by the control device of an electric vehicle according to the present embodiment will be described. The slip control unit 23 performs speed-type PID control as the feedback control. More specifically, a value that is the sum of (1) to (3) in the following is set as a fluctuation amount, the value is added to a value of previous motor torque, and torque upper and lower limits are provided, whereby output torque (command torque) is set.

(1) Value in which a difference between the MG rotation speed and the target rotation speed is multiplied by I gain (2) Value in which a differential value of the difference between the MG rotation speed and the target rotation speed is multiplied by P gain (3) Value in which a twice-differentiated value of the difference between the MG rotation speed and the target rotation speed is multiplied by D gain Here, in the beginning of the feedback control, the slip control unit 23 uses motor torque of before a start of the feedback control as a default value. Accordingly, it is possible to control a torque fluctuation in switching of control.

Also, in a case where the target rotation speed is not satisfied (case where driving side is equal to or slower than target rotation speed), a fluctuation amount of the motor torque in the PID control is set to be equal to or larger than 0. Accordingly, when the motor torque already reaches an upper limit and the target rotation speed is not reached yet, it is possible to control separation of command torque from the upper limit due to a P term and a D term and to avoid excessive control.

Also, in the PID control, in order to remove an extreme torque fluctuation due to an influence of a noise by the wheel speed sensor 19 or a fluctuation in command torque, a fluctuation amount of the target rotation speed may not be included in the D term and a dead band may be included in calculation of the fluctuation amount, for example.

Also, in the above description, control of a case where the electric vehicle Ve is driven (driving side control) has been described. However, control of a case where the electric vehicle Ve is decelerated by regeneration of the motor 11 (decelerating side control) can be performed in a similar manner. In this case, the target rotation speed calculation unit 22 calculates a target rotation speed corresponding to a traveling state by subtracting a certain ratio (slip ratio) from a vehicle body speed. Then, the slip control unit 23 integrates an amount for which an MG rotation speed becomes slower than the target rotation speed, and detects a slip and starts slip control in a case where the integrated amount exceeds a predetermined threshold.

(Torque Upper and Lower Limits)

In the following, torque upper and lower limits in the slip control performed by the control device of an electric vehicle according to the present embodiment will be described with reference to FIG. 4 to FIG. 6. The slip control unit 23 determines torque upper and lower limits in the slip control on the basis of a basic command torque calculated by the basic command torque calculation unit 20.

Figure 4:
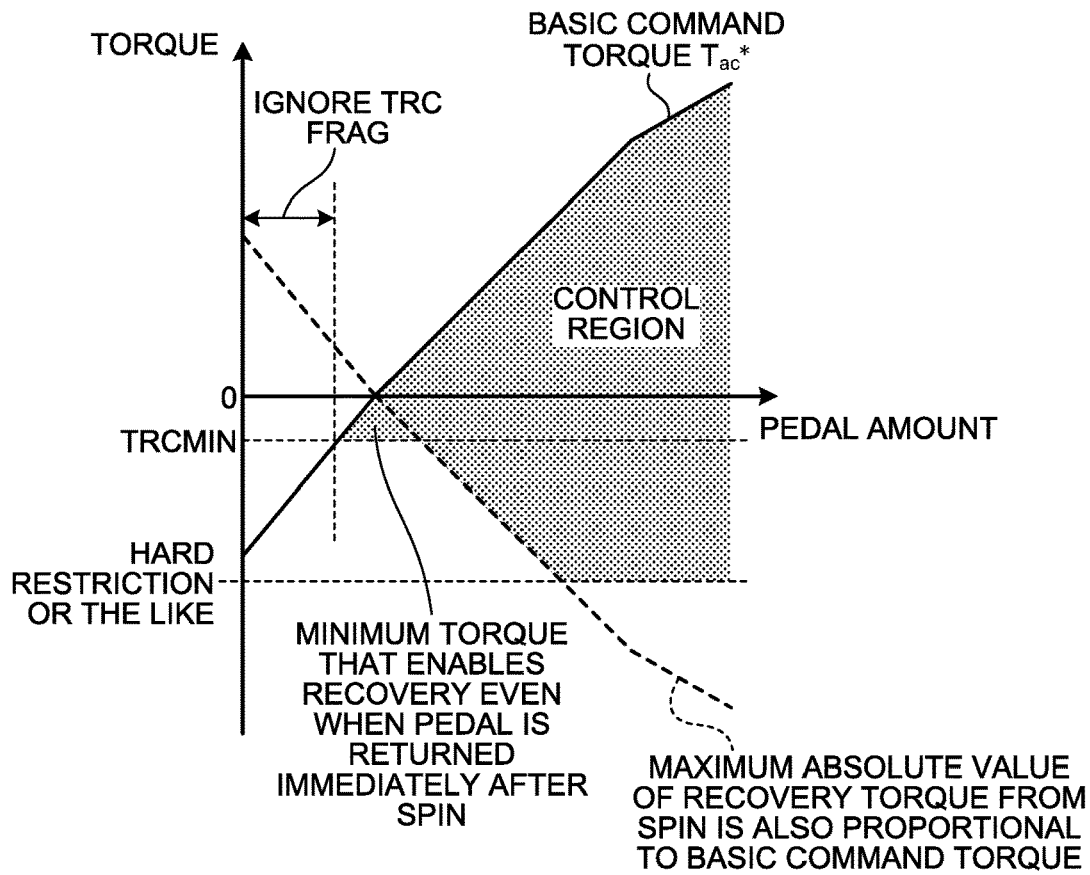
FIG. 4 is a view illustrating a control range of feedback control in driving of the electric vehicle in the control device of an electric vehicle according to the embodiment of the present disclosure.
Figure 5:
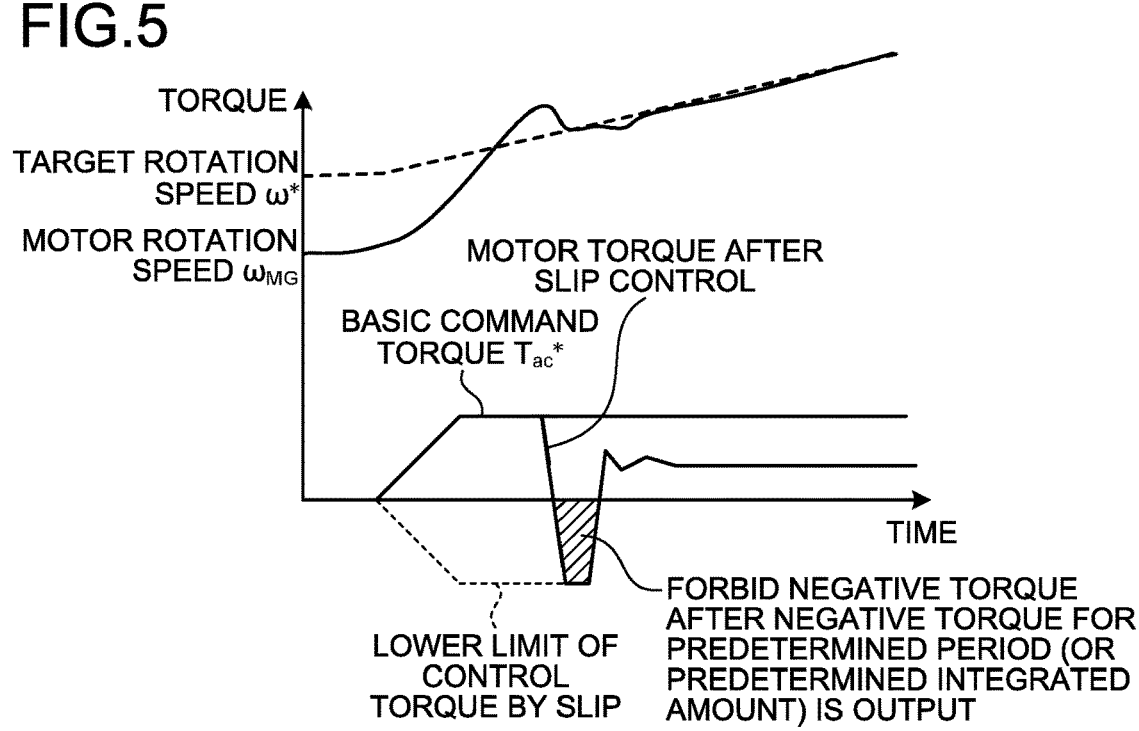
FIG. 5 is a view illustrating an example of a motor torque in the feedback control in the control device of an electric vehicle according to the embodiment of the present disclosure.

For example, as illustrated in FIG. 4, the slip control unit 23 sets, as an upper limit of motor torque, a basic command torque of a case where there is no slip and sets predetermined negative torque (regeneration torque) as a lower limit of the motor torque in feedback control during driving of the electric vehicle Ve.

A value of the negative torque is determined according to an excess amount of the MG rotation speed with respect to the target rotation speed. Note that since the excess amount of the MG rotation speed with respect to the target rotation speed is substantially proportional to original basic command torque, the basic command torque may be set as a lower limit of the motor torque. Also, as illustrated in FIG. 5, an output of the negative torque is permitted only for a predetermined period (predetermined integrated amount) and the output is forbidden thereafter.

Note that in FIG. 4, "TRCMIN" indicates a lower limit of torque for recovery from a spin and is previously set. Also, "IGNORE TRC FRAG" indicates a region in which the torque control is not performed.

On the one hand, for example, as illustrated in FIG. 6, the slip control unit 23 sets predetermined positive torque as an upper limit of motor torque and sets, as a lower limit of the motor torque, basic command torque of a case where there is no slip in feedback control during deceleration (during regeneration) of the electric vehicle Ve. In this case, an output of the positive torque is permitted only for a predetermined period (predetermined integrated amount) and the output is forbidden thereafter similarly to the case of driving.

Note that in FIG. 6, "ABSMAX" indicates an upper limit of torque for recovery from a lock and is previously set. Also, "IGNORE ABS FLAG" indicates a region in which the torque control is not performed.

In such a manner, by setting the torque upper and lower limits in the slip control, it is possible to perform control without a feeling of strangeness even in a case where a slip ratio is increased/decreased suddenly during the slip control. That is, by setting a torque upper limit, it is possible to control driving force or braking force becoming higher than expectation of a driver even in a case where a slip ratio is suddenly decreased (case where grip is performed). Also, by setting a torque lower limit, it is possible to recover a slip appropriately within a range in which a driver does not feel anxious even in a case where a slip ratio is increased suddenly.

(Determination of End of Slip Control)

In the following, a detail of determination of an end of the slip control performed by the control device of an electric vehicle according to the present embodiment will be described. In a case where a wheel speed does not reach a target rotation speed for a certain period, the slip control unit 23 assumes that there is no slip and stops the slip control. This can be also checked from the following. That is, motor torque determined by the slip control eventually corresponds to command torque for a certain period. Note that in addition to the above, the slip control unit 23 also stops the slip control in a case where command torque is reversed.

In the following, a control method by the control device of an electric vehicle according to the present embodiment will be described with reference to FIG. 7. First, the vehicle body speed estimation unit 21 estimates a vehicle body speed of the electric vehicle Ve from a wheel speed input from the wheel speed sensor 19 (step S1). Subsequently, the target rotation speed calculation unit 22 calculates a target rotation speed from the vehicle body speed estimated by the vehicle body speed estimation unit (step S2).

Subsequently, the slip control unit 23 integrates an amount for which an MG rotation speed exceeds the target rotation speed (step S3). Subsequently, the slip control unit 23 determines whether the integrated amount calculated in step S3 exceeds a predetermined threshold (step S4).

In a case where it is determined in step S4 that the integrated amount exceeds the predetermined threshold (Yes in step S4), the slip control unit 23 determines that there is a slip and determines motor torque (command torque) by PID control according to a difference between the MG rotation speed and the target rotation speed (step S5). Note that in a case where it is determined in step S4 that the integrated amount exceeds a predetermined threshold (No in step S4), the slip control unit 23 returns to step S1.

Subsequently, the slip control unit 23 performs control of the motor torque (execute current control) through the power control unit 13 (step S6). Subsequently, the slip control unit 23 determines whether the wheel speed is slower than the target rotation speed for a certain period (step S7).

In a case where it is determined in step S7 that the wheel speed is slower than the target rotation speed for the certain period (Yes in step S7), the slip control unit 23 ends the present control. Note that in a case where it is determined in step S7 that the wheel speed is not slower than the target rotation speed for the certain period (No in step S7), the slip control unit 23 returns to step S5.

According to the control device of an electric vehicle in the above-described manner, an MG rotation speed is detected by the rotation speed detecting unit 12 that has high angular resolution capability and generates few detection delay, and detection and control of a slip are performed by utilization of the MG rotation speed. Thus, it is possible to control the slip appropriately.

In the above, the control device of an electric vehicle according to the present disclosure has been described in more detail. However, an idea of the present disclosure is not limited to these descriptions and should be interpreted widely on the basis of a description in claims. Also, it is needless to say that those acquired by various changes, modifications, or the like based on these descriptions are included in the idea of the present disclosure.

For example, in the above-described control device of an electric vehicle, an amount for vibration suppressing control may be added to output torque (command torque) of a motor 11 during non-slip in addition to an amount requested from a driver (basic command torque).

In slip control in this case, a result of the vibration suppressing control is set as output torque until a start condition of the slip control is satisfied (Yes in step S4 in FIG. 7), and the result of the vibration suppressing control is used as a previous value at a moment at which the slip control is started. On the one hand, a command value used for determination of upper and lower limits of the slip control is basic command torque (request torque) from a driver of a case where no vibration suppressing control is added. With such control, it is possible to reduce a torque fluctuation shock due to switching of control while giving priority to the slip control. Also, it is possible to control generation of acceleration/deceleration unexpected by a driver.

Also, the above-described "vibration suppressing control" means control to reduce a vibration element due to a twist of the drive shaft 15 or control to suppress a longitudinal vibration or pitch vibration of the electric vehicle Ve.

According to the control device of an electric vehicle of the present disclosure, it is possible to appropriately control a slip since detection and control of a slip is performed by utilization of a rotation speed of a motor which speed is detected by a rotation speed detecting unit.

According to an embodiment, in a control device of an electric vehicle according to the present disclosure, a rotation speed of a motor is detected by a rotation speed detecting unit that has high angular resolution capability and generates few detection delay, and detection and control of a slip is performed by utilization of the rotation speed of the motor.

According to an embodiment, the control device of an electric vehicle according to the present disclosure can remove a gap between the rotation speed of the motor and a wheel speed, and can detect a slip at high speed. Thus, it is possible to start slip control without a time lag.

According to an embodiment, since the control device of an electric vehicle according to the present disclosure can consider an amount of a twist of a drive shaft or an engagement backlash of a gear, it is possible to determine a start of slip control accurately without a delay.

According to an embodiment, the control device of an electric vehicle according to the present disclosure can control a torque fluctuation in switching of control.

According to an embodiment, by setting a torque upper limit in slip control, the control device of an electric vehicle according to the present disclosure can control driving force or braking force becoming higher than expectation of a driver even in a case where a slip ratio is suddenly decreased (case where grip is performed).

According to an embodiment, by setting a torque lower limit in slip control, the control device of an electric vehicle according to the present disclosure can recover a slip appropriately within a range in which a driver does not feel anxious even in a case where a slip ratio is increased suddenly.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device of an electric vehicle including a driving motor, and a rotation speed detector that detects a rotation speed of the motor, the control device comprising:
    a first processor programmed to function as a target rotation speed calculation unit that calculates a target rotation speed of a drive wheel on the basis of a vehicle body speed of the electric vehicle; and
    a second processor programmed to function as a slip control unit that detects a slip of the drive wheel in a case where a wheel speed exceeds the target rotation speed of the drive wheel and that controls motor torque of the motor so that the wheel speed becomes a speed that matches the target rotation speed in detection of the slip,
    wherein the slip control unit controls the motor torque by feedback control according to a difference between the rotation speed of the motor and the target rotation speed of the drive wheel in detection of the slip.

2. The control device of an electric vehicle according to claim 1,
    wherein the slip control unit integrates an excess amount of the rotation speed of the motor with respect to the target rotation speed of the drive wheel, and estimates that the wheel speed is in a state of exceeding the target rotation speed of the drive wheel, and detects the slip in a case where the integrated amount thereof exceeds a predetermined threshold.

3. The control device of an electric vehicle according to claim 2,
wherein the predetermined threshold is determined in proportion to magnitude of a fluctuation amount of the motor torque.

4. The control device of an electric vehicle according to claim 1,
wherein the slip control unit uses the motor torque before a start of the feedback control as a default value in the feedback control.

5. The control device of an electric vehicle according to claim 1, further comprising:
a third processor programmed to function as a basic command torque calculation unit that calculates basic command torque of the motor on the basis of an accelerator position, wherein the slip control unit controls the motor torque with the basic command torque in driving of the electric vehicle as an upper limit in the feedback control in the driving of the electric vehicle.

6. The control device of an electric vehicle according to claim 5,
wherein the slip control unit controls the motor torque with predetermined negative torque as a lower limit and permits an output of the negative torque only for a predetermined period in the feedback control in the driving of the electric vehicle.

\* \* \* \* \*